(12) United States Patent
Togashi

(10) Patent No.: US 7,394,647 B2
(45) Date of Patent: Jul. 1, 2008

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/898,867

(22) Filed: Sep. 17, 2007

(65) Prior Publication Data

US 2008/0080121 A1    Apr. 3, 2008

(30) Foreign Application Priority Data

Sep. 29, 2006    (JP) .................... 2006-269064

(51) Int. Cl.
*H01G 4/06*    (2006.01)

(52) U.S. Cl. .............. 361/321.1; 361/321.2; 361/306.1; 361/306.3; 361/307; 361/308.1

(58) Field of Classification Search ............. 361/321.1, 361/321.2, 306.1, 306.3, 311–313, 302–305, 361/307, 308.1, 308.2
See application file for complete search history.

(56) References Cited

U.S. PATENT DOCUMENTS 6,091,598 A * 7/2000 Kobayashi ................. 361/303
6,370,010 B1 * 4/2002 Kuroda et al. ............. 361/306.1
6,385,034 B2 * 5/2002 Tanaka ..................... 361/306.3
6,577,491 B1 * 6/2003 Ohtsuka et al. .......... 361/306.3
6,621,682 B1 * 9/2003 Takakuwa et al. ........ 361/306.3
6,819,543 B2 * 11/2004 Vieweg et al. ........... 361/306.3
6,934,145 B2 * 8/2005 Hsieh et al. .............. 361/321.2

FOREIGN PATENT DOCUMENTS

JP    A 5-066951    3/1993
JP    A 2003-051423    2/2003

* cited by examiner

*Primary Examiner*—Nguyen T Ha
(74) *Attorney, Agent, or Firm*—Oliff & Berridge, PLC

(57) ABSTRACT

A multilayer capacitor 10 of the present invention including: a dielectric body 12 formed by stacking a plurality of dielectric layers 12a; an internal layer portion 17 in which a first and second internal conductor layers 21 and 22 are stacked alternately in the dielectric body 12 via the dielectric layer 12a; external layer portions 19a and 19b in which a first and second external conductor layers 23 and 25 are stacked via the dielectric layer 12a; a first terminal electrode 31 connected with the first internal conductor layer 21 and the first external conductor layer 23, formed at least on a first side face 12A of the dielectric body 12; and a second terminal electrode 32 connected with the second internal conductor layer 22 and the second external conductor layer 25, formed at least on a second side face 12 B opposed to the first side face 12A.

11 Claims, 10 Drawing Sheets

MULTILAYER CAPACITOR

BACKGROUND OF THE INVENTION

1. Field of the Invention

The present invention relates to multilayer capacitor greatly reducing the equivalent serial inductance (ESL), more particularly relates to a multilayer capacitor used as a decoupling capacitor.

2. Description of the Related Art

In recent years, while advances have been made in reducing the voltage of power sources used for supplying power to large-scale integrated circuits (LSI's) and other integrated circuits, the load current has increased.

Therefore, it has become extremely difficult to keep fluctuations in the power source voltage to within tolerances when faced with rapid changes in the load current. Therefore, a decoupling capacitor (for example two-terminal structure multilayer ceramic capacitor) is now being connected to a power source. At the time of transitory fluctuation in the load current, current is supplied from this multilayer ceramic capacitor to the LSI of the central processing unit (CPU) etc. to suppress fluctuation of the power source voltage.

Along with the increasingly higher operating frequencies of today's CPU's, however, the fluctuations in the load current have become faster and larger. The equivalent serial inductance (ESL) of the decoupling capacitor itself now has a great impact on fluctuations of the power source voltage.

That is, since the ESL is high in a conventional multilayer ceramic capacitor, fluctuation of the power source voltage V easily becomes greater in the same way as above along with fluctuations in the load current i.

That is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \quad \text{equation 1}$$

where, dV is transitory fluctuation of voltage (V), i is the fluctuation of current (A), and t is the time of fluctuation (sec).

As a multilayer capacitor wherein the ESL is reduced, a multilayer capacitor shown in Japanese Unexamined Patent Publication No. 2003-51423 is known. According to this multilayer capacitor, parasitic inductance can be reduced. As a result, the ESL can be reduced. However, it has been required to further reducing the ESL.

Further, as a multilayer capacitor wherein the ESL is reduced, a multi-terminal multilayer capacitor is known. In the multi-terminal multilayer capacitor, by increasing external terminal electrode, current flow varying in direction can be realized in an internal conductor layer. As a result, further reducing of the ESL becomes possible.

However, in the multi-terminal capacitor, there are problems that preparing a plurality of internal conductor layer patterns is necessary, and that increasing number of external terminals results in higher manufacturing cost.

A capacitor having two patterns of conductor layers: a conductor layer of an internal layer portion and a protection conductor layer sandwiching the internal layer portion in stacking direction is shown in Japanese Unexamined Utility Model Publication No. 5-66951. However, the effects of reducing the ESL cannot be obtained sufficiently because the protection conductor layer is used for improving moisture resistance of the capacitor, and further, terminal electrodes are formed only on two end faces of a dielectric body in Japanese Unexamined Utility Model Publication No. 5-66951.

An object of the present invention is to provide a multilayer capacitor able to greatly reduce the ESL with low manufacturing cost.

SUMMARY OF INVENTION

[Means for Solving Problem]

To attain the above object, there is provided a multilayer capacitor A multilayer capacitor comprising a dielectric body formed by stacking a plurality of dielectric layers having an approximately rectangular parallelepiped shape; an internal layer portion in which a first internal conductor layer and a second internal conductor layer are stacked alternately in said dielectric body via said dielectric layer as mutually overlapping in stacking direction to form an internal electrode circuit of a capacitor; an external layer portion in which a first external conductor layer and a second external conductor layer, which are not overlapping in the stacking direction, are stacked in said dielectric body via said dielectric layer, the external conductor layer portions being adjacent to at least any of both end faces of said internal layer portion in the stacking direction of said first internal conductor layer and said second internal conductor layer; a first terminal electrode connected with said first internal conductor layer and said first external conductor layer, formed at least on a first side face of side faces of said dielectric body, the first side face being parallel to the stacking direction; and a second terminal electrode connected with said second internal conductor layer and said second external conductor layer, formed at least on a second side face opposed to said first side face of said dielectric body, wherein said first terminal electrode is formed straddling said first side face, and a third and a fourth side faces parallel to said stacking direction of said dielectric layer adjacent to said first side face; and said second terminal electrode is formed straddling said second side face, said third and said fourth side faces parallel to said stacking direction of said dielectric layer adjacent to said second side face.

Preferably, said first internal conductor layer comprises a first lead portion led out straddling said first side face, and said third and fourth side faces of said dielectric body, connected with said first terminal electrode; and said second internal conductor layer comprises a second lead portion led out straddling said second side face, and said third and fourth side faces of said dielectric body, connected with said second terminal electrode.

Preferably, said first external conductor layer comprises a third lead portion led out straddling said first side face, and said third and fourth side faces, connected with said first terminal electrode; and said second external conductor layer comprises a fourth lead portion led out straddling said second side face, and said third and forth side faces, connected with said second terminal electrode.

According to the multilayer capacitor of the present invention, in the external layer portion, the first external conductor layer and the second external conductor layer are stacked via said dielectric layer which are not overlapping in the stacking direction. Therefore, in case that electric-potential of the first terminal electrode is higher than that of the second terminal electrode, the electric current flows separately from the first terminal electrode to the first external conductor layer, and the electric current flows from the second external conductor layer into the second terminal electrode. On the other hand, in case that electric-potential of the second terminal electrode is higher than that of the first terminal electrode, the electric current flows separately from the second terminal electrode to the second external conductor layer, and the electric current flows from the first external conductor layer into the first terminal electrode. As stated above, in any cases, by making the electric flow separately that flows from terminal electrode to conductor layer, the ESL of whole multilayer capacitor can be reduced. Namely, the first and second external conductor layer portions act as a plurality of inductor components connected in parallel, so that the ESL of whole body of the multilayer capacitor can be reduced.

Also, in the multilayer capacitor according to the present invention, the first terminal electrode is formed straddling three side faces of a first, a third and a fourth side faces, and the second terminal electrode is formed straddling a second, a third and a fourth side faces. In this way, by connecting each external conductor layer to each terminal electrode formed straddling three side faces of the dielectric body, a current flow channel crossing area flows between each terminal electrode and each conductor layer becomes larger. As a result, the ESL of whole multilayer capacitor can be reduced.

That is, according to the multilayer capacitor according to the present invention, a great reduction in the ESL of the multilayer capacitor is achieved, fluctuation of the power source voltage can be suppressed, and it can be suitably used as a decoupling capacitor, etc.

Preferably, in case that a width of said third lead portion in vertical direction to said stacking direction of said dielectric layer is $W3$ in said third and fourth side faces; a width of said fourth lead portion in vertical direction to said stacking direction of said dielectric layer is $W4$ in said third and fourth side faces; a width of said first terminal electrode in vertical direction to said stacking direction of said dielectric layer is $L3$ in said third and fourth side faces; and a width of said second terminal electrode in vertical direction to said stacking direction of said dielectric layer is $L4$ in said third and fourth side faces, $W3<L3$, and $W4<L4$.

By making $W3<L3$ and $W4<L4$, it is possible to prevent exposure of a first and a second external conductor layers onto a third and a fourth side faces.

Preferably, in case that a width of said third and said fourth side faces in vertical direction to said stacking direction of said dielectric layer is $W0$, $0.15 \leq W3/W0 \leq 0.45$, and $0.15 \leq W4/W0 \leq 0.45$.

When the $W3/W0$ and $W4/W0$ are too small, the ESL of capacitor cannot be reduced sufficiently because the current separately flows from each terminal electrode to each external conductor layer becomes smaller. Also, when $W3/W0$ and $W4/W0$ are too large, there is a possibility of exposuring each external conductor layer on a third or a fourth side faces of a dielectric body 12, or contacting opposed first and second external conducting layers each other. Consequently, by making $W3/W0$ and $W4/W0$ within the above range in order to prevent these defects, the ESL of capacitor can be reduced.

Preferably, said external layer portion comprises pluralities of said first external conductor layer and said second external conductor layer.

Due to increasing a total number of each external conductor layer, the effect for separately flowing the current from each terminal electrode to external conductor layer is increased. As a result, reducing effect for the ESL of capacitor can be increased.

Preferably, a first space pattern, which is not connected with said first terminal electrode, is formed at a position along with said first side face in said first internal conductor layer. Preferably, a second space pattern, which is not connected with said second terminal electrode, is formed at a position along with said second side face in said second internal conductor layer.

According to a multilayer capacitor of the present invention, the first space pattern is formed against the first lead portion of the first internal conductor layer. Accordingly, the first lead portion comprises a pair of branch lead pattern led out from a main body of the first internal conductor layers to two corner portions wherein a first longitudinal direction side face and a lateral direction side face in the dielectric body are crossing. Consequently, in each first internal conductor layer, the current flows are formed from the respective corner portions of the branch lead pattern to diagonal corner portions, respectively, and these flows are crossing in a same plane at a main body of the first internal conductor layer.

As a result, the action canceling out the magnetic field is occurred at current flow crossing position, so that parasitic inductance of the multilayer capacitor can be smaller, and effect of reducing the equivalent serial inductance is occurred.

Further, by arranging pluralities of the first internal conductor layer having the first space pattern and the two types of the conductor layers of the second internal conductor layer in the dielectric body, not only does the electrostatic rise, but also the action canceling out the magnetic field becomes greater, the inductance is more greatly reduced, and the ESL is reduced further.

In said first external conductor layer, a first external layer space pattern, which is not connected with said first terminal electrode, may be formed at a position along with said first side face. Further, in said second external conductor layer, a second external layer space pattern, which is not connected with said second terminal electrode, may be formed at a position along with said second side face.

Preferably, widths of said first and second side faces in vertical direction to said stacking direction of said dielectric layer is larger than widths of said third and fourth side faces in vertical direction to said stacking direction of said dielectric layer.

Namely, in the present invention, the first terminal electrode and the second terminal electrode are formed in a longitudinal direction (the first and second side faces). Namely, the first terminal electrode and the second terminal electrode are facing each other in the lateral direction (a direction opposing the first and the second side faces). As a result, a distance between the terminals (the distance of the first terminal electrode and the second terminal electrode) becomes shorter resulting in shorter current channels, so that the ESL is further reduced. Also, even though the first space pattern is formed on the first lead portion to form the first terminal electrode and the second terminal electrode along with each longitudinal side face of a dielectric body, connecting length between each lead portion and each terminal electrode can be secured sufficiently.

Note that the first internal conductor layer and the second internal conductor layer are relative concept in the present invention, and thus, the first internal conductor layer and the second internal conductor layer may be converse. Further, other "a first . . . " and "a second . . . " are similar to this. The first external conductor layer and the second conductor layer are similar, too.

DESCRIPTION OF THE PREFERRED EMBODIMENTS

First Embodiment

Figure 1:
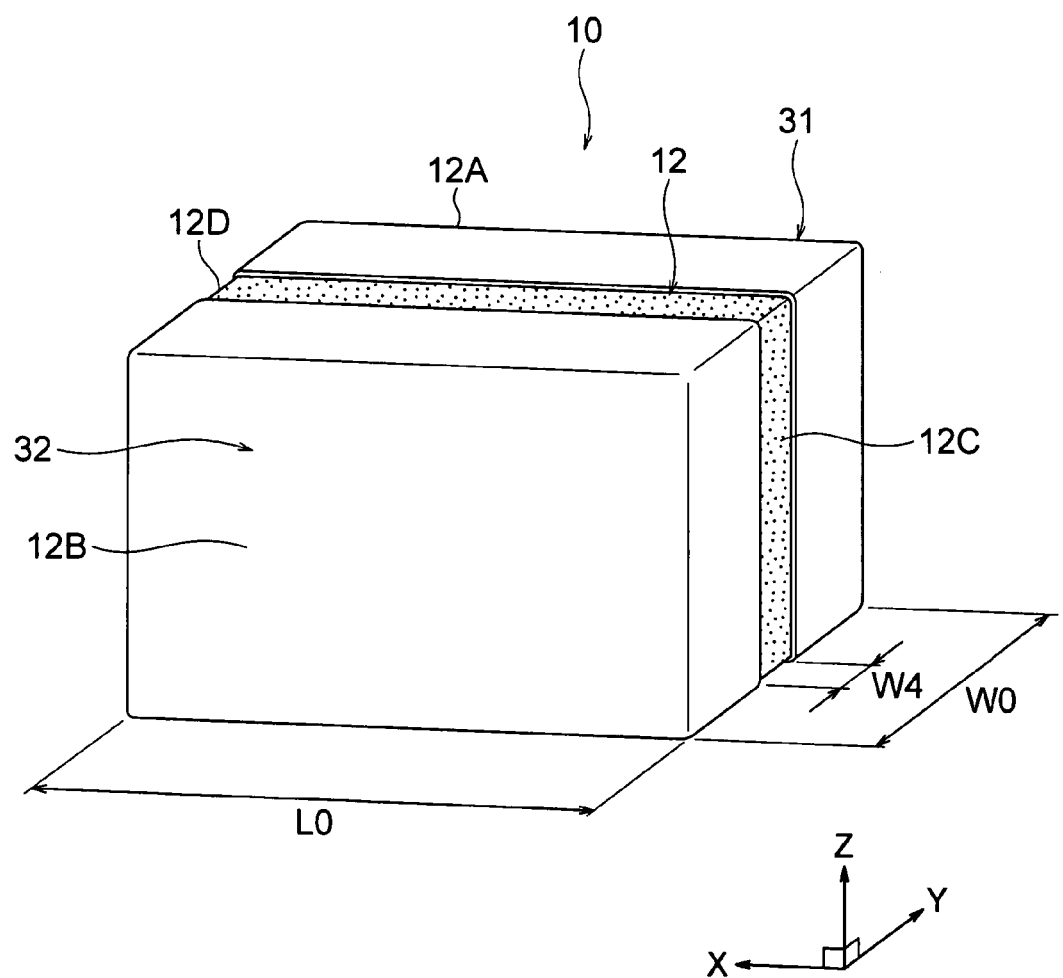
FIG. 1 is a perspective view of a multilayer capacitor in a first embodiment of the present invention.

Whole constitution of a multilayer ceramic capacitor (herein after simply referred to as a "multilayer capacitor") 10 of a first embodiment of the present invention is specified. As shown in FIG. 1, the multilayer capacitor comprises a dielectric body 12, a rectangular parallelepiped shaped sintered body, obtained by firing a stack of a plurality of ceramic green sheets as dielectric layers.

The dielectric body 12 comprises a first side face 12A and a second side face 12B opposed to the first side face. Also, the dielectric body 12 comprises a third side face 12C and a fourth side face 14 adjacent to the first side face 12A and the second side face 12B, being parallel to the stacking direction Z of the dielectric layers and opposed each other.

In the present embodiment, preferably, as shown in FIG. 1, width L0 of the first side face 12A and the second side face 12B in vertical direction to the stacking direction Z (X-direction) of the dielectric layer is larger than width W0 of the third side face 12C and the fourth side face 12D in vertical direction to the stacking direction Z (Y-direction) of the dielectric layer.

Below, in the explanation of the present embodiment, it is described that the first side face 12A is a first longitudinal direction side face 12A, the second side face 12B is a second longitudinal direction side face 12B, the third side face 12C is a third lateral direction side face 12, and the fourth side face 12D is a fourth lateral direction side face 12D.

On an external surface of the dielectric body 12, a first terminal electrode 31 is formed straddling the first longitudinal direction side face 12A, and the two lateral direction side faces 12C and 12D. Further, a second terminal electrode 32 is formed straddling the second longitudinal direction side face 12B, and the two lateral direction side faces 12C and 12D.

A pair of terminal electrodes 31 and 32, as being insulated is each other, are spaced with width W4 along with Y-direction on the opposed lateral side faces 12C and 12D of the body 12. The width of W4 is preferably 0.3 to 0.5 mm.

The multilayer capacitor 10 of the present embodiment is a two terminal structure multilayer capacitor wherein the terminal electrodes 31 and 32 are arranged on whole side faces 12A to 12F of the rectangular parallelepiped shaped (hexahedron shaped) dielectric body 12.

Figure 2:
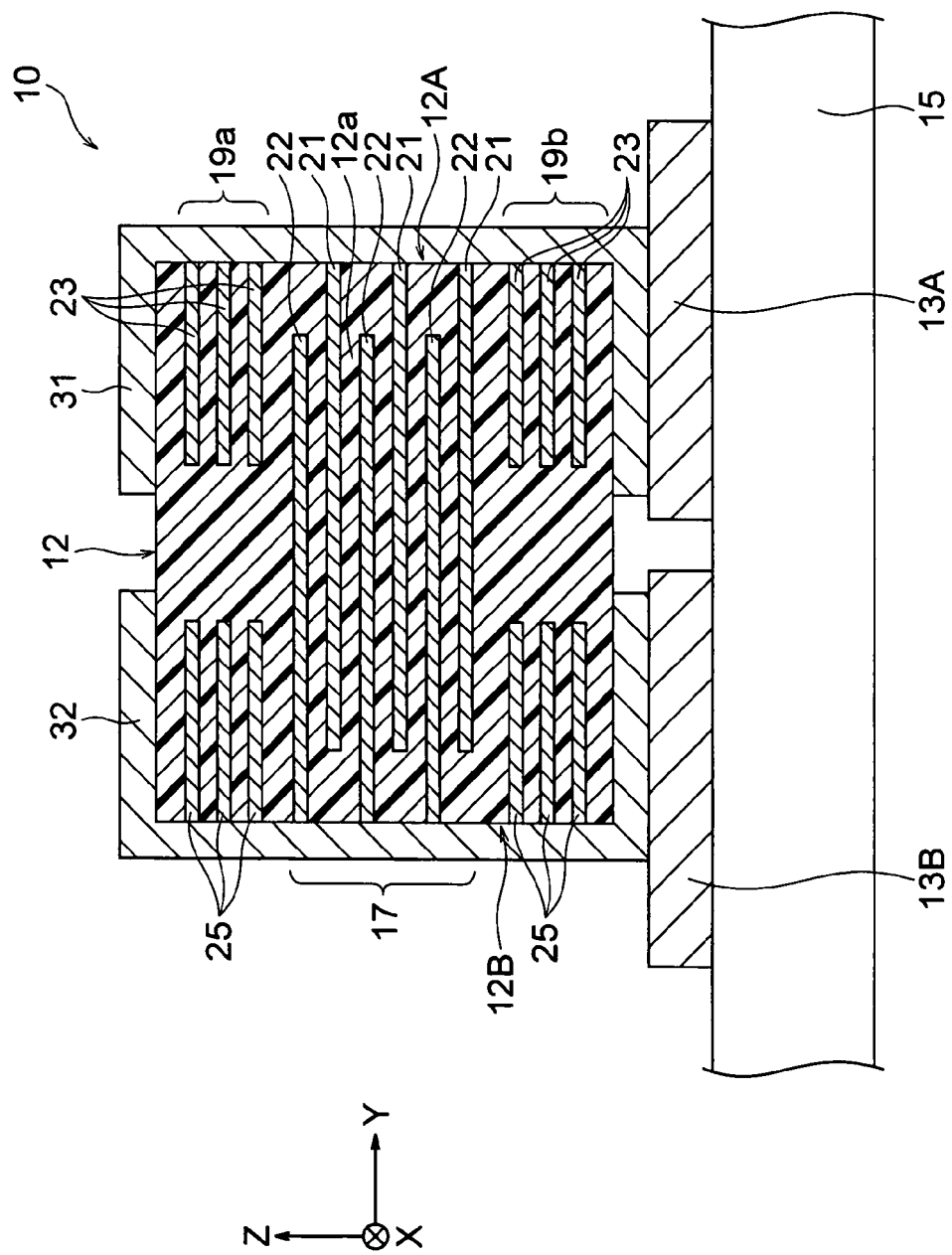
FIG. 2 is a schematic cross sectional view of the multilayer capacitor of FIG. 1.

FIG. 2 is a sectional view of the multilayer capacitor 10 shown in FIG. 1 wherein the capacitor is cut in parallel to the lateral side faces 12C and 12D. As shown in FIG. 2, the first terminal electrode 31 and the second terminal electrode 32 are connected on a circuit substrate 15 via substrate side electrode terminals 13A and 13B.

The multilayer capacitor 10 comprises an internal layer portion 17, an external layer portions 19a and 19b. The external layers 19a and 19b are positioned so as to be adjacent to both end faces of the internal layer portion 17.

In the internal layer portion 17, a first internal conductor layer 21 and a second internal conductor layer 22 are alternately stacked via a dielectric layer 12a so as to overlap each other in the stacking direction Z, to form an internal electrode circuit of a capacitor. In the present embodiment, three each of the first and the second internal conductor layers 21 and 22 are alternately arranged in the dielectric body 12, sandwiched between the dielectric layers 12a. Note that, as the material of these internal conductor layers 21 and 22, not only may base metal materials such as nickel, nickel alloy, copper, or copper alloy be considered, but also materials having these materials as main ingredient may be considered.

In the external layer portions 19a and 19b, a first external conductor layer 23 and a second external conductor layers 25 are alternately stacked via the dielectric layer 12a without overlapping each other in the stacking direction. Note that, as the materials of these external conductor layers 23 and 25, the similar materials described previously may be used.

Preferably, the external layer portions 19a and 19b comprise pluralities of the first external conductor layer 23 and the second external conductor layer 25, respectively.

The first internal conductor layer 21 and the first external conductor layer 23 are connected to the first terminal electrode 31. Also, the second internal conductor layer 22 and the second external conductor layer 25 are connected to the second terminal electrode 32.

Figure 3A:
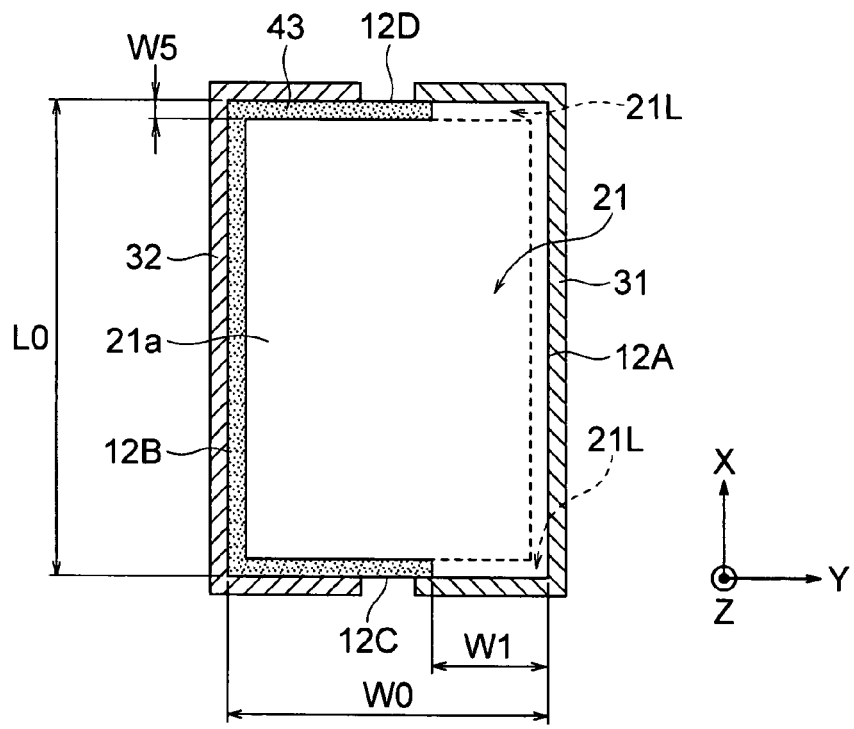
FIG. 3A and FIG. 3B are plane views of a first internal conductor layer and a second internal conductor layer shown in FIG. 2, respectively.
Figure 3B:
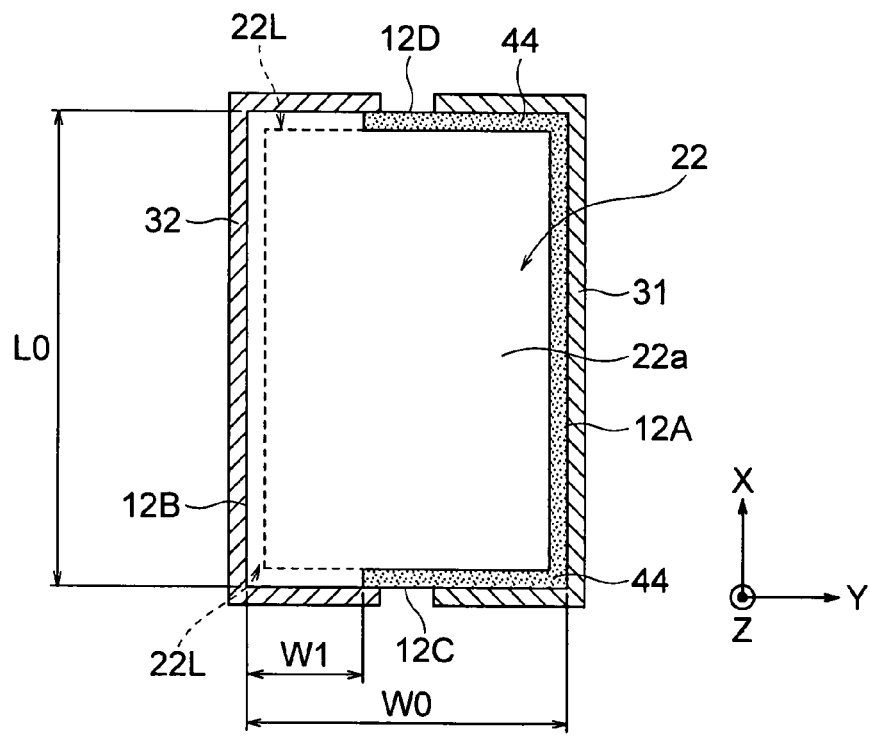

FIG. 3A and FIG. 3B are plane views observed from the stacking direction Z wherein the first internal conductor layer 21 and the second internal conductor layer 22 both shown in FIG. 2. As shown in FIG. 3, the first internal conductor layer 21 and the second internal conductor layer 22 thinly extend toward to a longitudinal direction X of the dielectric body 12.

The internal conductor layer 21 of FIG. 3A has a shape corresponding to an external shape of the dielectric layer 12a, and a main body portion 21a spaced with predetermined insulating space pattern 43 from circumference end portion of the dielectric layer 12a. The main body portion 21a of an internal conductor layer is a part of composing one of electrodes of a capacitor. The internal conductor layer 21 is formed on the same plane with the main body portion 21a integrally, and further comprises a first lead portion 21L led out straddling three adjacent side faces of the dielectric body 12 each other (the first longitudinal direction side face 12A, the third lateral direction side face 12C, and the fourth lateral direction side face 12D). In the first lead portion 21L, the first internal conductor layer 21 and the first terminal electrode 31 are connected.

The internal conductor layer 22 of FIG. 3B has a shape corresponding to an external shape of the dielectric layer 12a, and a main body portion 22a spaced with predetermined insulating space pattern 44 from circumference end portion of the dielectric layer 12a. The main body portion 22a of the internal conductor layer is a part of composing the other electrode of the capacitor. The internal conductor layer 22 is formed on the same plane with the main body portion 22a integrally, and comprises a second lead portion led out straddling three adjacent side faces of the dielectric body 12 each other (the second longitudinal direction side face 12B, the third lateral direction side face 12C, and the fourth lateral direction side face 12D). In the second lead portion 22L, the second internal conductor layer 22 and the second terminal electrode 32 are connected.

Figure 4:
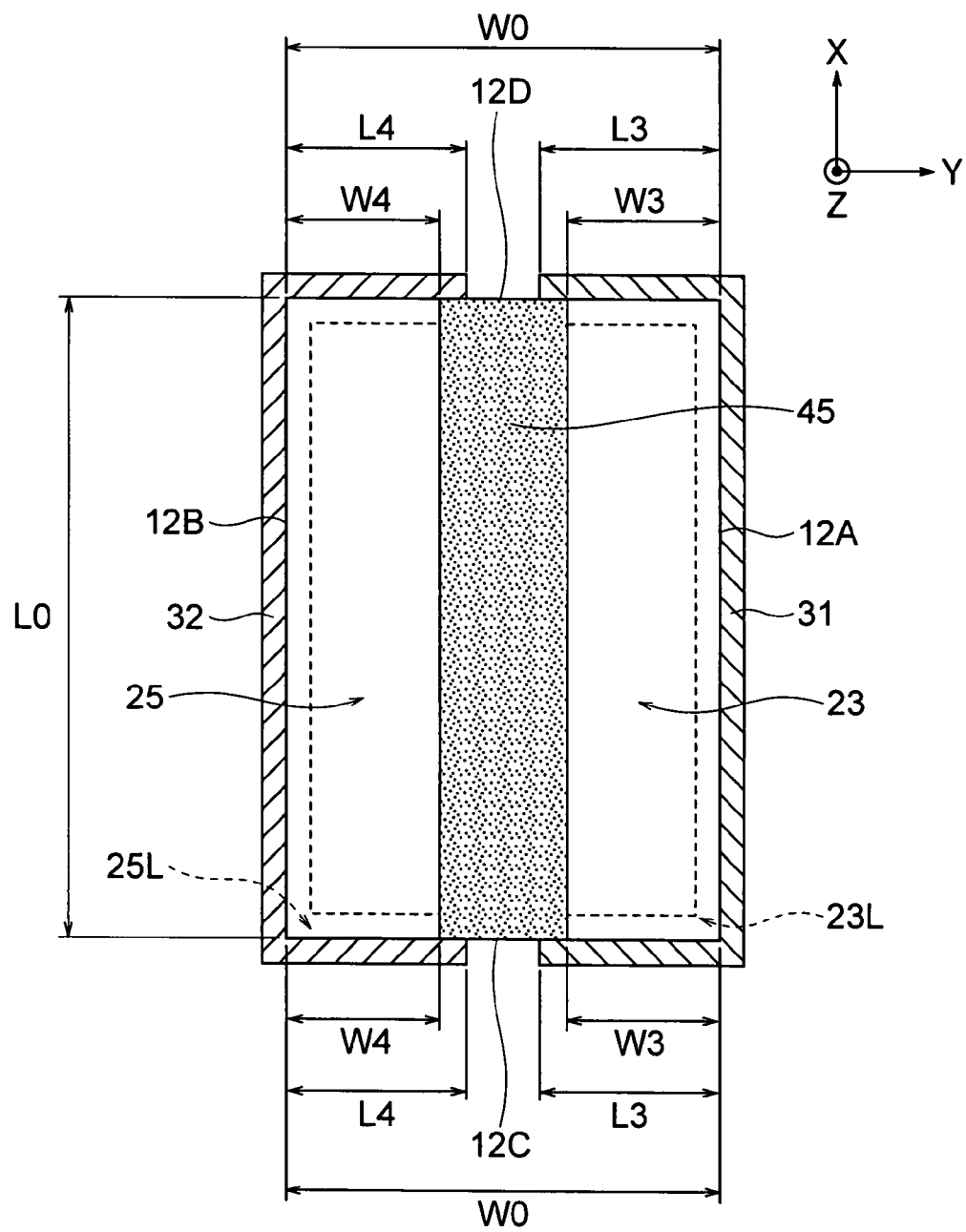
FIG. 4 is a plane view of a first external conductor layer and a second external conductor layer shown in FIG. 2.

FIG. 4 is a plane view wherein the first external conductor layer 23 and the second external conductor layer 25 shown in FIG. 2, observed from the stacking direction Z. As shown in FIG. 4, the first external conductor layer 23 and the second external conductor layer 25 thinly extend toward to a longitudinal direction X of the dielectric body 12. Note that, in the present embodiment, as shown in FIG. 4, the external conductor layer 23 and the second external conductor layer 25 are arranged on an identical plane which is in vertical to the stacking direction Z, in a manner sandwiching the insulating space pattern 45. Therefore, the first external conductor layer 23 and the second external conductor layer 25 arranged on an identical plane are not electrically connected.

Note that the first external conductor layer 23 and the second external conductor layer 25 are not necessarily arranged on an identical plane as far as not to overlap in the stacking direction X each other.

The first external conductor layer 23 comprises a third lead portion 23L which is integrally formed with the first external conductor layer 23 on an identical plane, and led out straddling three adjacent side faces of the dielectric body 12 each other (the first longitudinal direction side face 12A, the third lateral direction side face 12C, and the fourth lateral direction side face 12D). In the third lead portion 23L, the first external conductor layer 23 is connected to the first terminal electrode 31.

The second external conductor layer 25 comprises a fourth lead portion 25L which is integrally formed with the second external conductor layer 25 on an identical plane, and led out straddling three adjacent side faces of the dielectric body 12 each other (the second longitudinal direction side face 12B, the third lateral direction side face 12C, and the fourth lateral direction side face 12D). In the fourth lead portion 25L, the second external conductor layer 25 is connected to the second terminal electrode 32.

Preferably, as shown in FIG. 4, when a width of the third lead portion 23L in lateral direction, a width of the fourth lead portion 25L, a width of the first terminal electrode 31 and a width of the second terminal electrode 32 is W3, W4, L3 and L4, respectively, W3<L3, and W4<L4.

By making W3<L3 and W4<L4, it is possible to prevent exposure of the first external conductor layer 23 and the second external conductor layer 25 on the third lateral direction side face 12C and the fourth lateral direction side face 12D.

Preferably, a width of the third direction side face 12C and a width of the fourth lateral direction side face 12D in lateral direction Y, are W0, $0.15 \leq W3/W0 \leq 0.45$, and $0.15 \leq W4/W0 \leq 0.45$.

When W3/W0 and W4/W0 are too small, the effect of reducing the ESL of capacitor cannot be obtained sufficiently because the spread current flow from each terminal electrode to each external conductor layer becomes smaller. Also, when W3/W0 and W4/W0 are too large, there is a possibility that each external conductor layer is exposed on the side faces of the dielectric body 12 or that the opposing first and second external conducting layers 23 and 25 contact each other. Consequently, by making W3/W0 and W4/W0 within the above range in order to prevent these defects, the ESL of capacitor can be reduced.

Next, function of the multilayer capacitor 10 according to the present embodiment will be explained.

In the multilayer capacitor 10, as shown in FIG. 2, at external layer portions 19a and 19b, the first external conductor layer 23 and the second external conductor layer 25 are stacked via dielectric layer 12a so as not to overlap each other in the stacking direction Z. Also, the first external conductor layer 23 and the second external conductor layer 25 are not electrically connected. Therefore, the first external conductor layer 23 and the second external conductor layer 25 are dummy electrodes having no function of an internal electrode (storage function) in a capacitor.

Here, for instance, in case of electric-potential of the first terminal electrode 31 is higher than that of the second terminal electrode 32, the electric current spreads from the first terminal electrode 31 to the first external conductor layer 23. Simultaneously, the electric current flows from the second external conductor layer 25 into the second terminal electrode 32. On the other hand, in case that electric-potential of the second terminal electrode 32 is higher than that of the first terminal electrode 31, the electric current spreads from the second terminal electrode 32 to the second external conductor layer 25. Simultaneously, the electric current flows from the first external conductor layer 23 into the first terminal electrode 31.

In the multilayer capacitor 10 of the present embodiment, in any cases of both stated above, as a result of the electric current to be spread flow from terminal electrodes to each external conductor layer which are dummy electrodes, the ESL of whole multilayer capacitor 10 can be reduced.

Further, in the multilayer capacitor 10, the first terminal electrode 31 is formed straddling the following three side faces: first longitudinal direction side face 12A, the third lateral direction side face 12C, and the fourth lateral direction side face 12D. Similarly, the second terminal electrode 32 is formed straddling the following three side faces: second longitudinal direction side face 12B, the third lateral direction side face 12C, and the fourth lateral direction side face 12D. In this manner, by connecting respective terminal electrode formed straddling three side faces of the dielectric body 12 with respective external conductor layers, the current flow channel crossing area between each terminal electrode and each conductor layer becomes larger. As a result, the ESL of whole multilayer capacitor 10 can be reduced.

Figure 5:
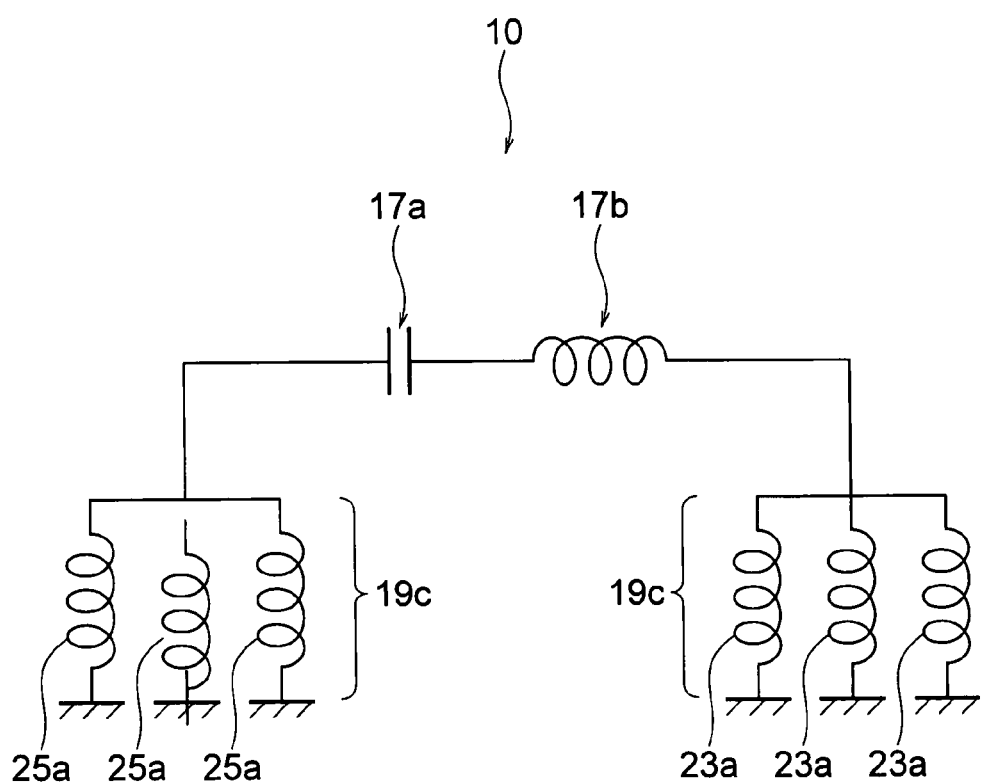
FIG. 5 is a circuit diagram showing functions of a first and a second internal conductor layers of an internal layer portion, and a first and a second external conductor layers of an external layer portion of the multilayer capacitor of a first embodiment of the present invention.

FIG. 5 is a circuit diagram of respective functions of the first and the second internal conductor layers 21 and 22 of the internal layer portions 17 and the first and the second external layers 23 and 25 of the external layers 19b as stated above. As shown in FIG. 5, the internal layer portion 17 shown in FIG. 2 is illustrated by a capacitor circuit 17a and an inductance component 17b included in the capacitor circuit 17a itself. Also, three of the first external conductor layers 23 in the external layer portions 19b shown in FIG. 2, are shown as a plurality of a first inductor components 23a (three in FIG. 5) connected in parallel shown in FIG. 5. Similarly, three of the second external conductor layers 25 in the external layer portion 19b are shown as a plurality of a second inductor components 25a (three in FIG. 5) connected in parallel shown in FIG. 5.

Three juxtaposed first inductor components 23a are connected to the first terminal electrode 31. Consequently, the inductance included by three of the first inductor components 23a can be considered as inductance included by the first terminal electrode 31. Similarly, three juxtaposed second inductor components 25a are connected to the second terminal electrode 32. Consequently, the inductance included by the second inductor components 25a can be considered as inductance included by the first terminal electrode 32. By connecting a plurality of the first inductor components 23a to the first terminal electrode 31 in parallel, the inductance of whole first terminal electrode can be reduced. Similarly, by connecting a plurality of the second inductor components 25a to second terminal electrode 32, the inductance of whole second terminal electrode can be reduced. By reducing the inductance 19c of whole terminal electrodes included in the first and the second terminal electrodes 31 and 32, the ESL of whole multilayer capacitor 10 can be reduced.

Note that, in the two external layer portions 19a and 19b shown in FIG. 2, the current does not flow in the external layer portion 19a positioned on an opposite side of a circuit substrate 15 in a manner sandwiching the internal layer portion 17. Therefore, the external layer portion 19a is not indispensable because it does not contribute the ESL reduction.

In the present embodiment, in the external layer portions 19a and 19b, the first external conductor layer 23 and the second external conductor layer 25 are stacked via the dielectric layer 12a so as not to overlap each other in the stacking direction Z. Therefore, the current spreads from the first terminal electrode 31 to the first external conductor layer 23, and the current flows from the second external conductor layer 25 to the second terminal electrode 32. Alternatively, the current spreads from the second terminal electrode 32 to the second external conductor layer 25, and the current flows from the first external conductor layer 23 to the first terminal electrode 31. In this manner, by spreading the electrode from terminal electrode to the respective external conductor layers, the ESL of whole multilayer capacitor can be reduced.

In the present embodiment, the first terminal electrode 31 is formed straddling three side faces, the first longitudinal direction side face 12A, the third lateral direction side face 12C, and the fourth lateral side face 12D, and the second terminal electrode 32 is formed straddling the second longitudinal direction side face 12B, the third lateral direction side face 12C and the fourth lateral direction side face 12D. In this manner, by connecting each terminal electrode formed straddling three side faces of the dielectric body 12 to each external conductor layer, a current flow channel crossing area between each terminal electrode and each external conductor layer becomes larger. As a result, the ESL of whole multilayer capacitor 10 can be reduced.

In this manner, according to the multilayer capacitor 10 of the present embodiment, a great reduction in the ESL of the multilayer capacitor 10 is achieved, fluctuation of the power source voltage can be suppressed, and the capacitor can be suitably used as a decoupling capacitor, etc.

Second Embodiment

Next, a second embodiment of the present invention will be explained. Note that, in the following, explanation of common in the first embodiment and the second embodiment are omitted, and only different points of both embodiments will be explained.

Figure 6A:
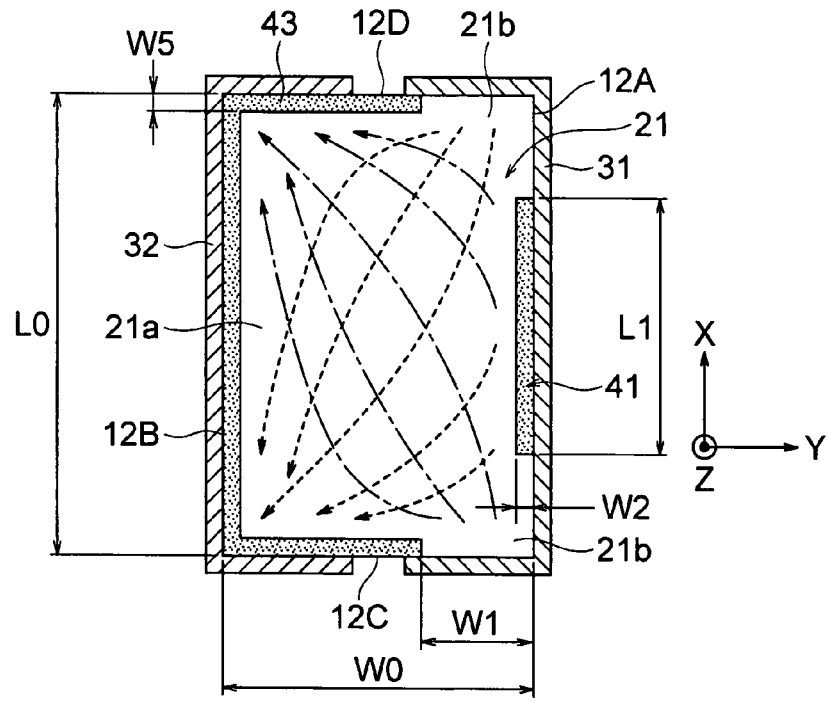
FIG. 6A and FIG. 6B are plane views of a first internal conductor layer and a second internal conductor layer of a multilayer capacitor in a second embodiment of the present invention, respectively.

As shown in FIG. 6A, in the present embodiment, in the first lead portion of the first internal conductor layer 21, the first space pattern 41 which is not connected to the first terminal electrode 31 is formed at a center position along with the first longitudinal direction side face 12A. Consequently, the first lead portion comprises a pair of branch lead patterns 21b led out from a main body 21a of the first internal conductor layer 21 to two corner portions wherein the first longitudinal direction side face 12A and the lateral side faces 12C and 12D of the dielectric body 12 are crossing.

In case that the width of the lateral direction Y of the dielectric body 12 is W0, the width W1 of the lateral direction Y of the branch lead pattern 21b of the first lead portion is determined so that a ratio of W1/W0 is within a range of 0.15 to 0.45, preferably, 0.25 to 0.35.

Also, in case that the width of the longitudinal direction X of the dielectric body 12 is L0, the width L1 of the longitudinal direction of the first space pattern 41 is determined so that a ratio of L1/L0 is within a range of 0.2 to 0.5, preferably, 0.3 to 0.4.

In the present embodiment, the first space pattern 41 is formed at a center position of a longitudinal direction X of the first longitudinal direction side face 12A of the dielectric body 12. An insulation space pattern 43 is formed continuously straddling the second longitudinal direction side face 12B, and the lateral side faces 12C and 12D of the dielectric body 12, and both end portions of the longitudinal direction of the space pattern 43 contact to the branch lead pattern 21b of the first lead portion. In the present embodiment, a plane pattern of the first internal conductor layer 21 is a line symmetrical pattern to a centerline passing through a center position of the longitudinal direction X of the dielectric body 12.

The width of a space W2 of the first space pattern 41 is comparable to the width of space W5 of the insulating space 43, and preferably, 100 to 200 μm or so. If these electrode widths W2 and W5 are too small, the insulation properties with each terminal electrode 31 or 32 is liable to be insufficient; when too large, an area of the main body portion 21a will be narrower and an ability as capacitor is liable to decline.

Figure 6B:
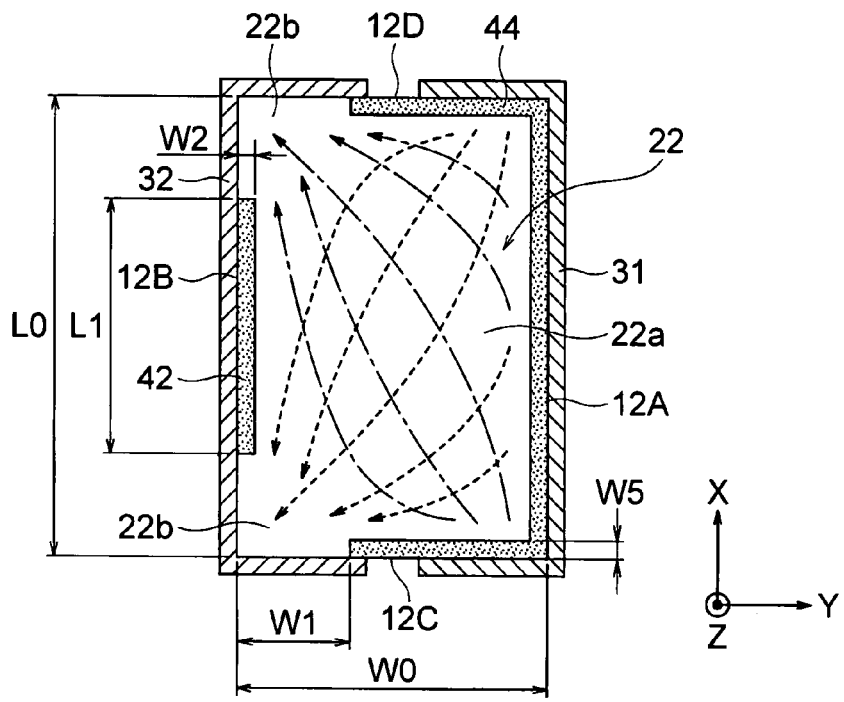

As shown in FIG. 6B, in the present embodiment, in the second lead portion of the second internal conductor layer 22, the second space pattern 42 which is not connected to the second terminal electrode 32 is formed at a center position along with the second longitudinal direction side face 12B. Consequently, the second lead portion comprises a pair of branch lead patterns 22b led out from a main body 22a of the first internal conductor layer 22 to two corner portions wherein the second longitudinal direction side face 12B and the lateral side faces 12C and 12D of the dielectric body 12 are crossing.

In this embodiment, a shape of the second internal conductor layer 22a is a pattern that the first internal conductor layer 21a is rotated 180 degrees around on a XY plane, having similar dimensions (L0, L1, W1, W0, W2 and W5).

From the above relation of the dimensions, the lead patterns 21b and 22b formed on the two types of the first and the second internal conductor layers 21 and 22 respectively are arranged in a positional relationship not overlapping when projected in the stacking direction Z of the dielectric layer 12a. The respective body portions 21a and 22a are overlapping when projected in the stacking direction Z of the dielectric layer 12a to compose a capacitor through the dielectric layer 12a.

Next, the effect of the multilayer capacitor 10 according to the present embodiment will be explained.

According to the multilayer capacitor 10 of the present embodiment, two types of internal conductor layers 21 and 22 are alternately arranged in a manner sandwiched between the dielectric layers in a dielectric body 12 formed into a rectangular parallelepiped shape by stacking a plurality of dielectric layers. These two types of the internal conductor layers 21 and 22 are arranged in a positional relationship not overlapping when projected in the stacking direction of the dielectric layer and are led out straddling three side faces of the dielectric body 12. Further, the two type of the terminal electrodes 31 and 32 are arranged at the outside of the dielectric body 12 straddling three side faces of the dielectric body 12. These two terminal electrodes 31 and 32 are connected to either of the two types of the internal conductor layers 21 and 22.

Furthermore, in the multilayer capacitor 10 according to the present embodiment, a first space pattern 41 is formed to the first lead portion of the first internal conductor layer 21. Consequently, the first lead portion comprises a pair of branch lead patterns 21b led out from a main body 21a of the first internal conductor layer 21 to two corner portions wherein the first longitudinal direction side face 12A and the lateral side faces 12C and 12D of the dielectric body are crossing. Consequently, in the first internal conductor layer 21, the current flows are made from corner portions of the respective branch lead pattern 21b to respective diagonal corner portions, and these flows are crossing in an identical plane at the main body 21a of the first internal conductor layer 21.

Similarly, in each of the second internal conductor layers 22, the current flow is made from corner portions of the respective branch lead pattern 22b to respective diagonal corner portions, and these flows are crossing in an identical plane at the main body 22a of the internal conductor layer 22.

As a result, an action canceling out the magnetic field rises at positions where the currents are crossing, along with this, the effects arise that the parasitic inductance of the multilayer capacitor 10 itself can be reduced and the ESL is reduced.

Further, in the present embodiment, since the first terminal electrode 31 and the second terminal electrode 32 are mutually opposed in the lateral direction Y, a distance between the terminals become shorter, so that a reduction in the ESL of the multilayer capacitor is achieved at this point as well. Further, even though forming the space patterns 41 and 42 at each lead portion in order to form the first terminal electrode 31 and the second terminal electrode 32 along with the first and the second longitudinal direction side faces 12A and 12B respectively, contact lengths of the branch lead patterns 21b and 22b of each lead portion and each of the terminal electrodes 31 and 32 can be secured sufficiently.

Further, in the present embodiment, by arranging pluralities of the two types of the first and the second internal conductor layers 21 and 22 in the dielectric body 12, not only does the electrostatic capacitance rise, but also the action canceling out the magnetic field becomes a greater, the inductance is more greatly reduced, and the ESL is further reduced.

Third Embodiment

Next, a third embodiment of the present invention will be explained based on FIG. 7A to FIG. 7D. Note that, in the following, matters common in the first, the second and the third embodiments are omitted, and only different points of the above embodiments and the third embodiment will be explained.

Figure 7A:
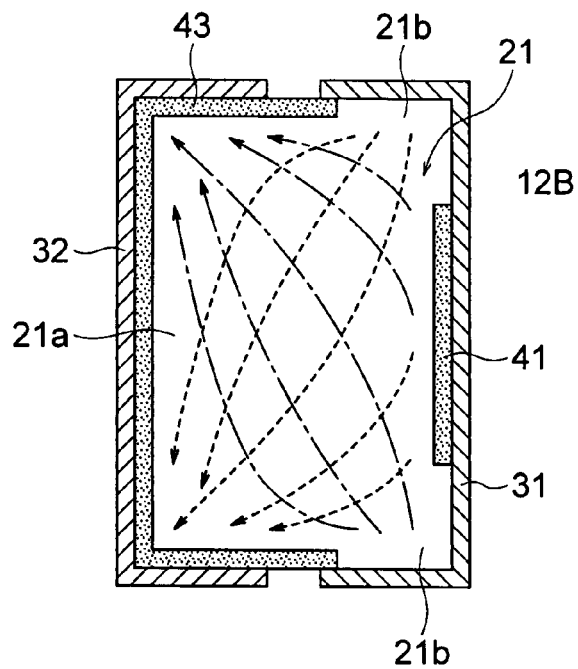
FIG. 7A to FIG. 7D are plane views of a first to a fourth internal conductor layers of a multilayer capacitor in a third embodiment of the present invention.
Figure 7B:
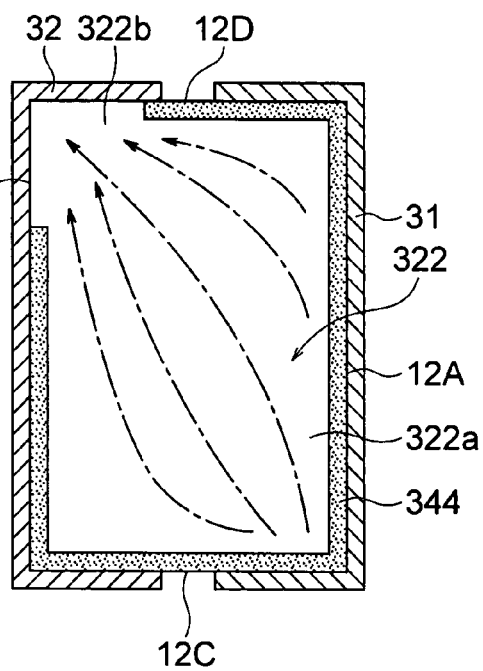
Figure 7C:
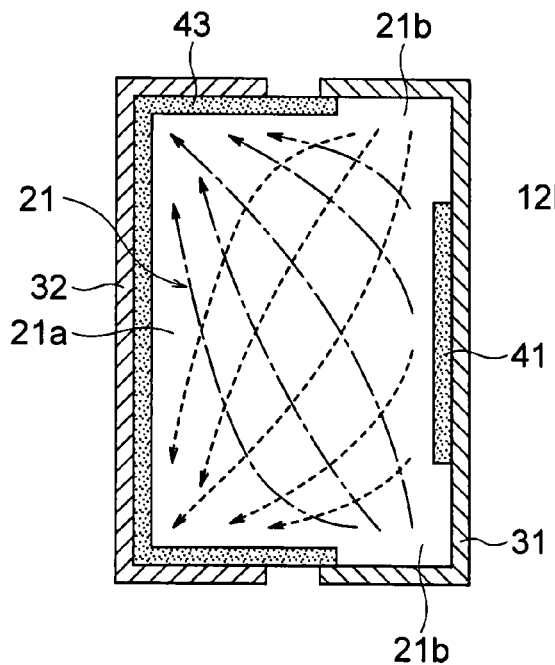
Figure 7D:
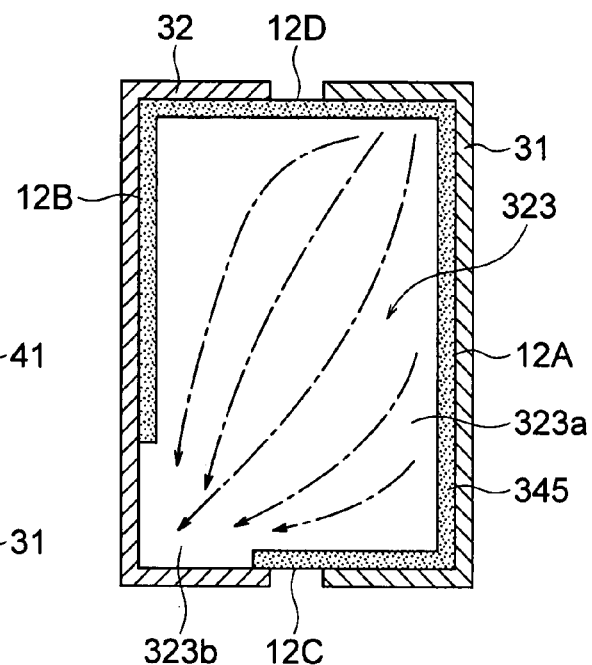

In the present embodiment, other than substituting the second internal conductor layer 22 of the second embodiment with two types of the second internal conductor layers 322 shown in FIG. 7B and FIG. 7D and the second internal conductor layers 323 shown in FIG. 7D, a multilayer capacitor is composed in the same way as in the first embodiment.

In the present embodiment, the second internal conductor layer 322 shown in FIG. 7B is stacked via the dielectric layer 12a under the first internal conductor layer 21 shown in FIG. 7A which is the same as that of the second embodiment, and the first conductor layer 21 shown in FIG. 7C which is the same as the second embodiment is stacked via the dielectric layer 12a under the second internal conductor layer 322. Then, the second internal conductor layer 323 shown in FIG. 7D is stacked via the dielectric layer 12a under the first conductor layer 21. Below this, it is repeated to stack the conductor layers 21, 322, 21 and 323 stated above shown in FIG. 7A to FIG. 7D.

In the present embodiment, the second internal conductor layer 322 comprises an internal conductor layer body portion 322a corresponding to a main body 22a of the second internal conductor layer according to the second embodiment, and a single lead pattern 322b corresponding to a branch lead pattern 22b. The single lead pattern 322b is only connected to the second terminal electrode 32 positioned at a corner portions where the second longitudinal direction side face 12B and the fourth lateral direction side face 12D are crossing.

In order to form the single lead pattern 322b only, an insulating space pattern 344 which is continued in the area without the lead pattern 322b, is formed around the internal conductor layer body portion 322a.

On the other hand, the second internal conductor layer 323 comprises an internal conductor layer body portion 323a corresponding to a main body 22a of the second internal conductor layer according to the second embodiment, and a single lead pattern 323b corresponding to a branch lead pattern 22b. The single lead pattern 323b is only connected to the second terminal electrode 32 positioned at a corner portion where the second longitudinal direction side face 12B and the third lateral direction side face 12C are crossing.

In order to form the single lead pattern 323b only, an insulating space pattern 345 which is continued in the area without the lead pattern 323b, is formed around the internal conductor layer body portion 323a.

In the multilayer capacitor according to the present embodiment, the cross over current similar to the second embodiment can be expected to flow in the first conductor layer 21. Further, in two types of the second internal conductor layers 322 and 323, the diagonal current flows can be realized through the respective single lead pattern 322b or 323b. In between the two types of the second internal conductor layer 322 and 323 each other, the current flows are crossing.

Accordingly, comparing with the second embodiment, although the cross over current is not formed on each identical plane of the second internal conductor layer 322 or 323, flowing of the cross over current similar to the second embodiment can be expected in the first conductor layer 21. As a result, while it is slightly inferior to the second embodiment, actions and effects almost similar to those of the second embodiment can be expected.

Fourth Embodiment

Next, a fourth embodiment of the present invention will be explained. Note that, in the following, matters common in the above embodiments are omitted, and only different points of the above embodiments and the fourth embodiment will be explained.

Figure 8:
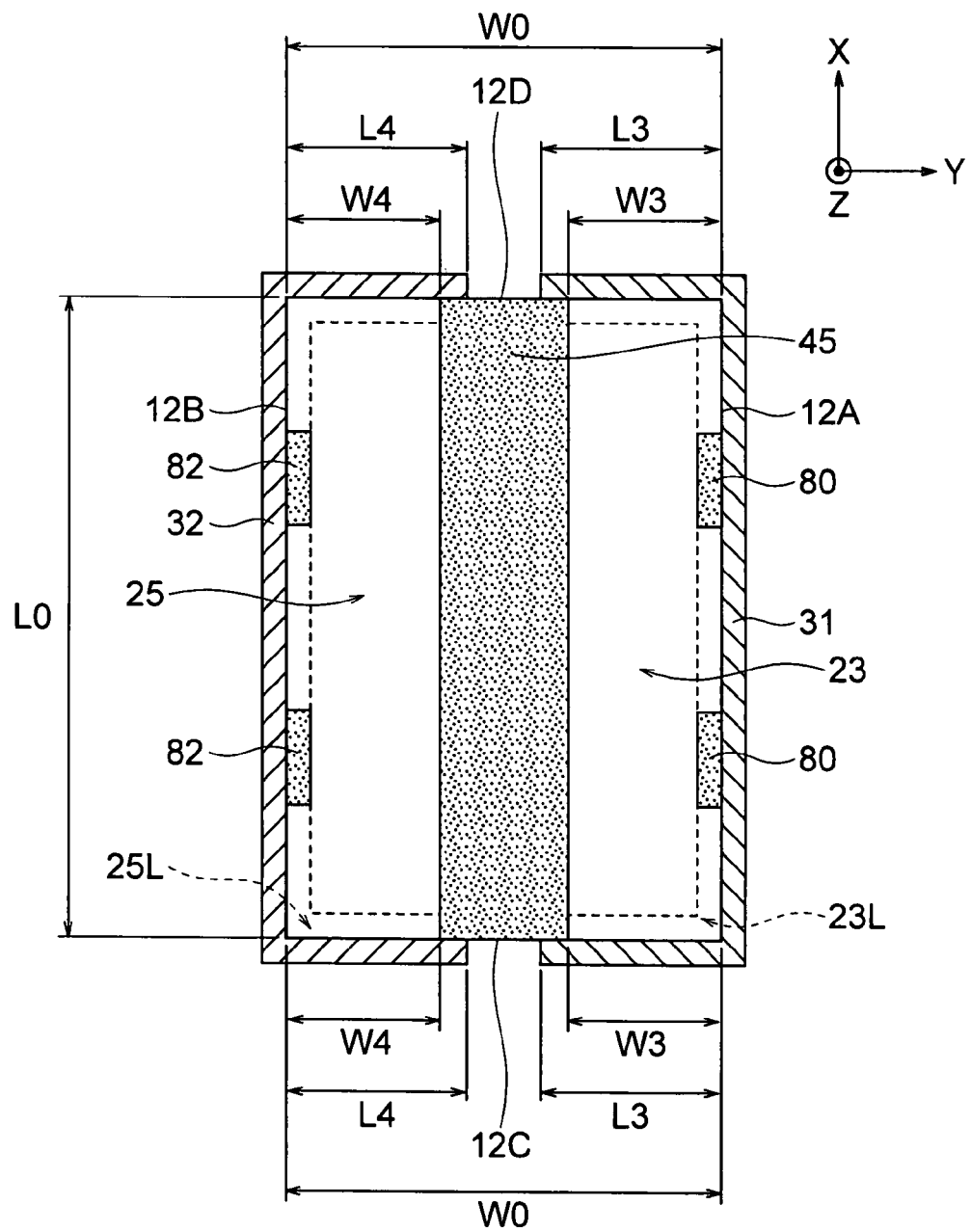
FIG. 8 is a plane view of a first and a second external conductor layers of a multilayer capacitor in a fourth embodiment of the present invention.

In the present embodiment, as shown in FIG. 8, in the first external conductor layer 23, a first external layer space pattern 80, which is not connected to the first terminal electrode 31, may be formed at a position along with the first longitudinal direction side face 12A. Further, in the second external conductor layer 25, a second external layer space pattern 82, which is not connected to the second terminal electrode 32, may be formed at a position along with the first longitudinal direction side face 12B.

In a process to form the first external conductor layer 23 and the second external conductor layer 25, normally, a cutting process for external electrode sheets wherein a large number of electrode patterns of the first external conductor layer 23 and the second external conductor layer 25 are formed translational-symmetrically will be necessary after stacking thereof via green sheet. After cutting this stacking layer, by checking whether the first external layer space pattern 80 and the second external layer space pattern 82 are arranged at a predetermined position, it is possible to confirm whether the individual first external conductor layer 23 and second external conductor layer 25 are cut out accurately, so that the misalignment of stacking can be prevented.

In such the fourth embodiment, actions and effects similar to those of the above mentioned first embodiment can be expected.

Fifth Embodiment

Next, a fifth embodiment of the present invention will be explained. Note that, in the following, matters common in the first to fourth embodiments are omitted, and only different points of the above embodiments and the fifth embodiment will be explained.

In the present embodiment, as shown in FIG. 9A to FIG. 9D, widths L0 of the first side face 12A and the second side face 12B in X direction is smaller than widths W0 of the third side face 12C and the fourth side face 12D in Y direction. In this case, actions and effects similar to the first embodiment can be expected.

Figure 9A:
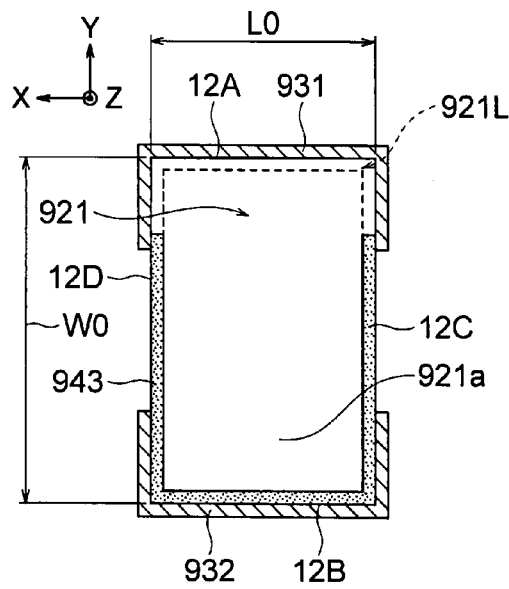
FIG. 9A and FIG. 9B are plane views of a first and a second internal conductor layers of a multilayer capacitor in a fifth embodiment of the present invention, respectively.
Figure 9B:
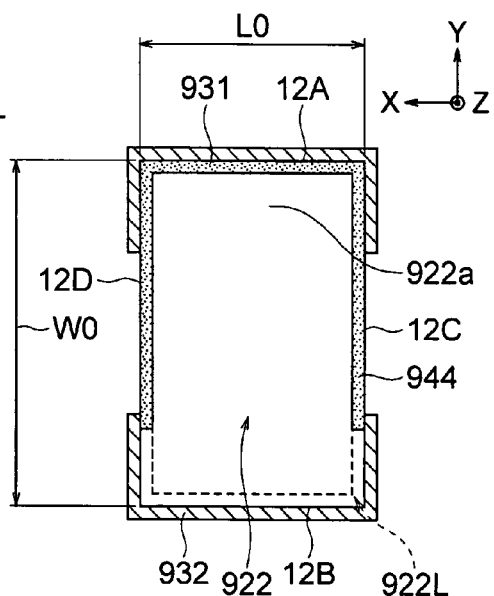
Figure 9C:
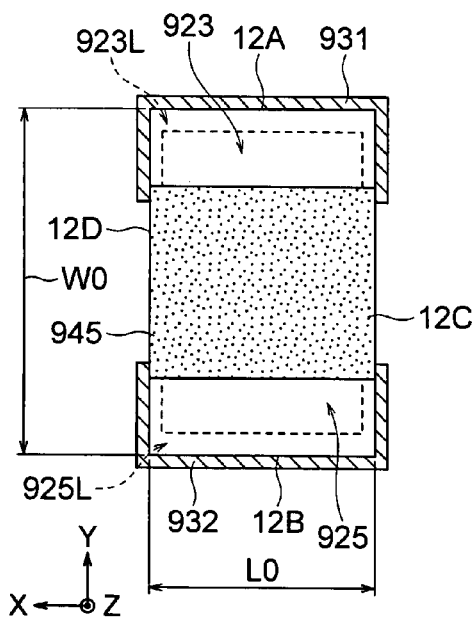
FIG. 9C and FIG. 9D are plane views of a first and a second external conductor layers of a multilayer capacitor in the fifth embodiment of the present invention.
Figure 9D:
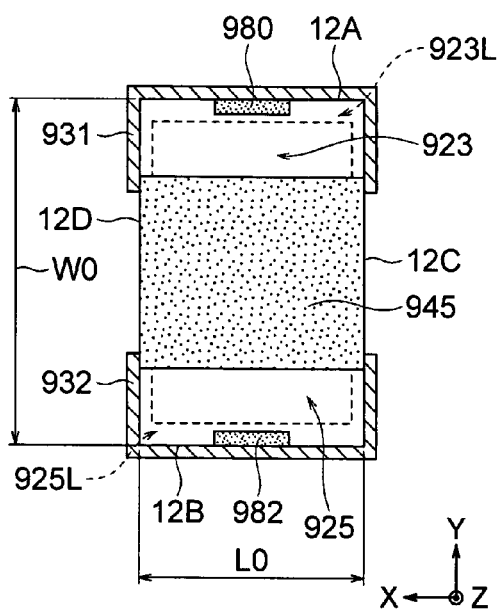

Note that, as shown in FIG. 9D, in a first external conductor layer 923, a first external layer space pattern 980, which is not connected to a first terminal electrode 931, may be formed at a position along with a position of the first side face 12A. Further, in a second external conductor layer 925, a second external layer space pattern 982, which is not connected to a second terminal electrode 932, may be formed at a position along with the second side face 12B.

Note that the present invention is not limited to the above embodiments and may be variously modified within the scope of the present invention.

For example, in the multilayer capacitor of the present invention, the number of staking layers is not particularly limited, and it is possible to provide tens or hundreds of layers. Further, in the present invention, the first space pattern and the second space pattern may not necessarily continue in a longitudinal direction but may be intermittently formed.

In the above described present embodiment, as shown in FIG. 2, a dielectric body 12 comprises two external layer portions 19a and 19b. The current does not flow in the external layer portion 19a of the two external layer portions, arranged in an opposite side of a circuit substrate 15 sandwiching an internal layer portion 17. Consequently, the external layer portion 19a is not indispensable since it does not contribute the reducing of the ESL. However, as a result that the dielectric layer body 12 comprises the external layer portion 19a, the external layer portion 19a and the external layer portion 19b are symmetrically positioned sandwiching the internal layer portion 17. Namely, the dielectric body 12 may have a balanced shape. As a result, it is possible to prevent deformation of the dielectric body 12 when firing the dielectric body 12. Further, as a result that the dielectric body 12 comprises the external layer portion 19a, even when the multilayer capacitor 10 of FIG. 2 is turned into upside down to the circuit substrate 15, it is possible to perform the multilayer capacitor 10.

EXAMPLE

Next, the present invention will be further explained based on specific example, but the present invention is not limited to this example. In the present example, the following the ESL of respective capacitor samples have been found by converting from S parameter to impedance by using impedance analyzer.

Firstly, each capacitor sample is explained. A two-terminal type multilayer capacitor according to the first embodiment as shown in FIG. 1 is a sample Ex1. Further, other than not comprising external layer portions 19a and 19b (first external conductor layer 23 and second external conductor layer 25), a capacitor formed in the same way as in the sample Ex1 is a sample Cex1. The ESL of each sample has been measured.

Figure 10:
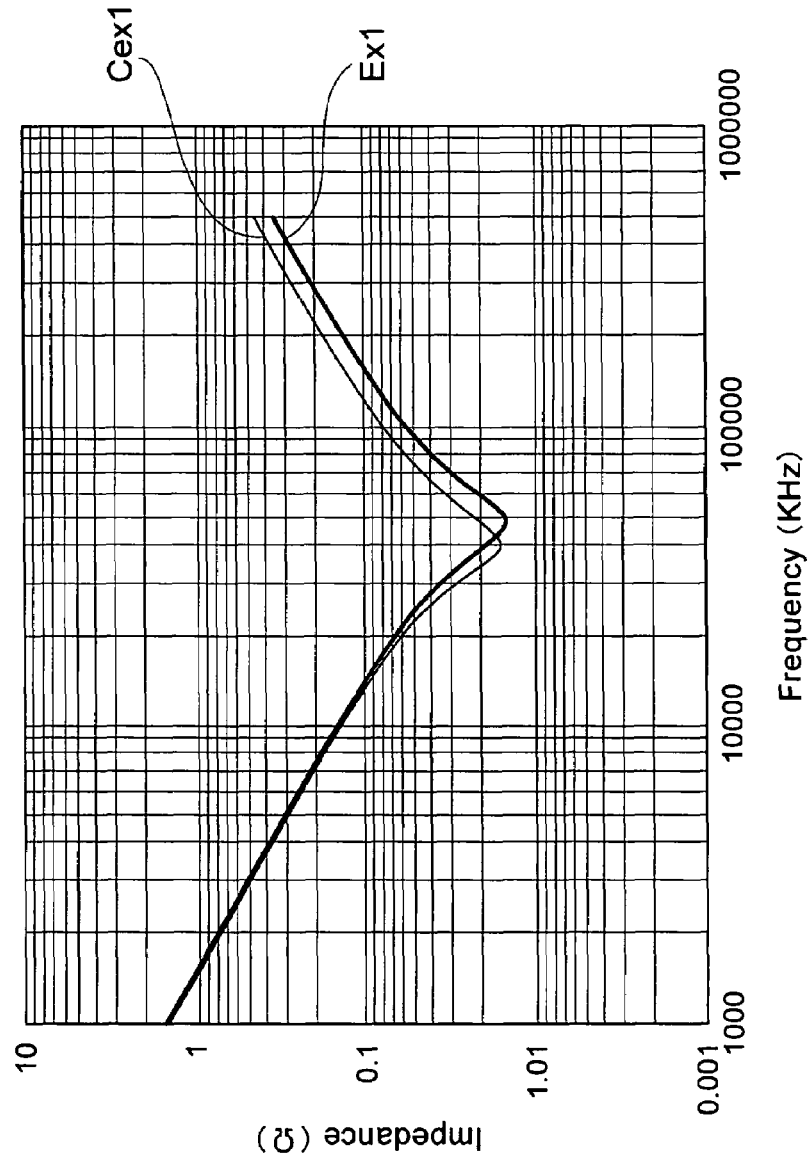
FIG. 10 is a graph of impedance characteristics of examples and comparative examples of the present invention.

As a result of this, impedance properties of each sample are measured. The results are shown in FIG. 10. As shown in a chart of FIG. 10, it was confirmed that a value of impedance of the sample Ex1 becomes smaller than the sample Cex1. Further, when measuring the ESL, the ESL is 122 pH in the sample Ex1, and the ESL is 140 pH in the sample Cex1. Namely, it was confirmed that the ESL is greatly reduced in the sample Ex1 according to the present embodiment of the present invention.

Note that the ESL is obtained from the following equation:

$2\pi f_o = 1/\sqrt{(ESL \cdot C)}$ where $f_o$ is the self resonant frequency; and C is the electrostatic capacity.

As the dimensions of the samples used here, in FIG. 4, L0=1.6 mm, W0 is 0.8 mm, W1, W3 and W4 are 0.25 mm respectively, and W5 is 0.15 mm. The number of stacking layers of the internal conductor layer is 25 in total, and the electrostatic capacity was 0.1 µF.

The invention claimed is:
1. A multilayer capacitor comprising:
a dielectric body formed by stacking a plurality of dielectric layers having an approximately rectangular parallelepiped shape;
an internal layer portion in which a first internal conductor layer and a second internal conductor layer are stacked alternately in said dielectric body via said dielectric layer as mutually overlapping in stacking direction to form an internal electrode circuit of a capacitor;
an external layer portion in which a first external conductor layer and a second external conductor layer, which are not overlapping in the stacking direction, are stacked in said dielectric body via said dielectric layer, the external conductor layer portions being adjacent to at least any of both end faces of said internal layer portion in the stacking direction of said first internal conductor layer and said second internal conductor layer;
a first terminal electrode connected with said first internal conductor layer and said first external conductor layer, formed at least on a first side face of side faces of said dielectric body, the first side face being parallel to the stacking direction; and
a second terminal electrode connected with said second internal conductor layer and said second external con- ductor layer, formed at least on a second side face opposed to said first side face of said dielectric body, wherein;

said first terminal electrode is formed straddling said first side face, and a third and a fourth side faces parallel to said stacking direction of said dielectric layer adjacent to said first side face; and said second terminal electrode is formed straddling said second side face, and said third and said fourth side faces parallel to said stacking direction of said dielectric layer adjacent to said second side face.

2. The multilayer capacitor as set forth in claim 1, wherein said first internal conductor layer has a first lead portion led out straddling said first side face, and said third and said fourth side faces of said dielectric body, connected with said first terminal electrode; and said second internal conductor layer has a second lead portion led out straddling said second side face, and said third and said fourth side faces of said dielectric body, connected with said second terminal electrode.

3. The multilayer capacitor as set forth in claim 1, wherein said first external conductor layer has a third lead portion led out straddling said first side face, and said third and said fourth side faces, connected with said first terminal electrode; and said second external conductor layer has a fourth lead portion led out straddling said second side face, and said third and said fourth side faces, connected with said second terminal electrode.

4. The multilayer capacitor as set forth in claim 3, wherein; in case that a width of said third lead portion in vertical direction to said stacking direction of said dielectric layer is $W3$ in said third and fourth side faces;

a width of said fourth lead portion in vertical direction to said stacking direction of said dielectric layer is $W4$ in said third and fourth side faces;

a width of said first terminal electrode in vertical direction to said stacking direction of said dielectric layer is $L3$ in said third and fourth side faces; and a width of said second terminal electrode in vertical direction to said stacking direction of said dielectric layer is $L4$ in said third and fourth side faces;

$W3<L3$, and $W4<L4$.

5. The multilayer capacitor as set forth in claim 4, in case that a width of said third and said fourth side faces in vertical direction to said stacking direction of said dielectric layer is $W0$;

$0.15 \leq W3/W0 \leq 0.45$, and $0.15 \leq W4/W0 \leq 0.45$.

6. The multilayer capacitor as set forth in claim 1, wherein said external layer portion comprises a plurality of said first external conductor layers and a plurality of said second external conductor layers.

7. The multilayer capacitor as set forth in claim 1, wherein a first space pattern which is not connected with said first terminal electrode, is formed at a position along with said first side face in said first internal conductor layer.

8. The multilayer capacitor as set forth in claim 1, wherein a second space pattern which is not connected with said second terminal electrode, is formed at a position along with said second side face in said second internal conductor layer.

9. The multilayer capacitor as set forth in claim 1, wherein a first external layer space pattern, which is not connected with said first terminal electrode, is formed at a position along with said first side face in said first external conductor layer.

10. The multilayer capacitor as set forth in claim 1, wherein a second external layer space pattern, which is not connected with said second terminal electrode, is formed at a position along with said second side face in said second external conductor layer.

11. The multilayer capacitor as set forth in claim 1, wherein widths of said first and said second side faces in vertical direction to said stacking direction of said dielectric layer is larger than widths of said third and said fourth side faces in vertical direction to said stacking direction of said dielectric layer.

* * * * *